United States Patent
Ramachandran et al.

(10) Patent No.: US 10,038,722 B2
(45) Date of Patent: Jul. 31, 2018

(54) ACCESS CONTROL POLICY MANAGEMENT IN A CLOUD SERVICES ENVIRONMENT

(71) Applicant: VMware, Inc., Palo Alto, CA (US)

(72) Inventors: Viswanathan Ramachandran, San Jose, CA (US); Jonathan Cook, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 78 days.

(21) Appl. No.: 14/844,521

(22) Filed: Sep. 3, 2015

(65) Prior Publication Data

US 2017/0070504 A1 Mar. 9, 2017

(51) Int. Cl.
*H04L 29/06* (2006.01)

(52) U.S. Cl.
CPC ............ *H04L 63/20* (2013.01); *H04L 63/061* (2013.01); *H04L 63/102* (2013.01)

(58) Field of Classification Search
CPC ...................................................... H04L 63/20
USPC ............................................................. 726/1
See application file for complete search history.

(56) References Cited

U.S. PATENT DOCUMENTS

| | | | | |
|---|---|---|---|---|
| 8,474,027 B2* | 6/2013 | Meijer | ................ | H04L 63/0807 726/10 |
| 8,769,644 B1* | 7/2014 | Eicken | ................ | H04L 67/1097 709/225 |
| 9,450,945 B1* | 9/2016 | Koeten | ................... | H04L 67/10 |
| 9,762,584 B2* | 9/2017 | Ford | ..................... | H04L 63/101 |
| 2006/0080352 A1* | 4/2006 | Boubez | ................... | H04L 63/08 |
| 2008/0134286 A1* | 6/2008 | Amdur | ................. | G06F 21/604 726/1 |
| 2009/0089625 A1* | 4/2009 | Kannappan | ............ | G06Q 10/10 714/39 |
| 2011/0119486 A1* | 5/2011 | Boldyrev | ................ | H04L 63/10 713/156 |
| 2011/0307408 A1* | 12/2011 | Gates | ..................... | G06Q 10/10 705/342 |
| 2012/0167197 A1* | 6/2012 | Kruger | .................... | G06F 12/00 726/16 |
| 2013/0036476 A1* | 2/2013 | Roever | ................... | H04L 63/08 726/27 |
| 2013/0086645 A1* | 4/2013 | Srinivasan | ............. | H04L 63/10 726/4 |
| 2014/0033278 A1* | 1/2014 | Nimashakavi | ........ | G06F 21/335 726/4 |

(Continued)

*Primary Examiner* — Harris C Wang (57) ABSTRACT

In an example, a method of managing access to resources managed by heterogeneous resource servers having different policy document formats in a cloud services environment includes obtaining, at an identity and access management (IAM) service, a policy document describing privileges of an end user with respect to accessing at least one resource of the resources managed by a resource server of the heterogeneous resource servers; sending the policy document from the IAM service to an resource server endpoint designated by the resource server for validation; storing, by the IAM service, the policy document in a datastore in response to a determination by the resource server endpoint that the policy document is valid; and generating, by the IAM service, an indication that the policy document is invalid in response to a determination by the resource server endpoint that the policy document is invalid.

14 Claims, 6 Drawing Sheets

(56) References Cited

U.S. PATENT DOCUMENTS

| | | | |
|---|---|---|---|
| 2014/0040993 A1* | 2/2014 | Lorenzo | G06F 21/41 726/4 |
| 2014/0181003 A1* | 6/2014 | Kling | G06F 17/30592 707/600 |
| 2014/0337914 A1* | 11/2014 | Canning | H04L 63/10 726/1 |
| 2014/0380048 A1* | 12/2014 | He | H04L 63/083 713/168 |
| 2015/0089569 A1* | 3/2015 | Sondhi | H04L 63/08 726/1 |
| 2015/0135258 A1* | 5/2015 | Smith | G06F 21/45 726/1 |
| 2015/0278245 A1* | 10/2015 | Sagar | G06F 17/30174 707/610 |
| 2016/0057027 A1* | 2/2016 | Hinrichs | G06F 15/173 709/224 |
| 2016/0269420 A1* | 9/2016 | Hur | H04L 63/126 |
| 2017/0054729 A1* | 2/2017 | Ford | H04L 63/101 |

\* cited by examiner

ACCESS CONTROL POLICY MANAGEMENT IN A CLOUD SERVICES ENVIRONMENT

BACKGROUND

In distributed microservice architecture based cloud services environments, various servers can have or otherwise manage protected resources, such as services, applications, virtual machines, host computers, other servers, network resources, storage resources, and the like. For user-centric access control, such computing environments can include an identity and access management (IAM) service that embeds access control polices in access tokens it issues to clients. The IAM service establishes the format of the policy document that is used to specify privileges for end users with respect to accessing protected resources. In such a configuration, the IAM service must find common ground among the various heterogeneous resource servers in the system to determine a standardized policy document format that is acceptable to all of the resource servers. Such a standardized policy document is not scalable and is not amenable to changes in the format. Since the standardized policy document has a format common to the entire system, scaling non-additive changes to the format involves every resource server in the system, which can be slow.

SUMMARY

One or more embodiments provide techniques for access control policy management in a cloud services environment. In an embodiment, a method of managing access to resources managed by heterogeneous resource servers having different policy document formats in a cloud services environment includes obtaining, at an identity and access management (IAM) service, a policy document describing privileges of an end user with respect to accessing at least one resource of the resources managed by a resource server of the heterogeneous resource servers. The method includes sending the policy document from the IAM service to a resource server endpoint designated by the resource server for validation, and storing, by the IAM service, the policy document in a datastore in response to a determination by the resource server endpoint that the policy document is valid. The method further includes generating, by the IAM service, an indication that the policy document is invalid in response to a determination by the resource server endpoint that the policy document is invalid.

Further embodiments include a non-transitory computer-readable storage medium comprising instructions that cause a computer system to carry out the above method above, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
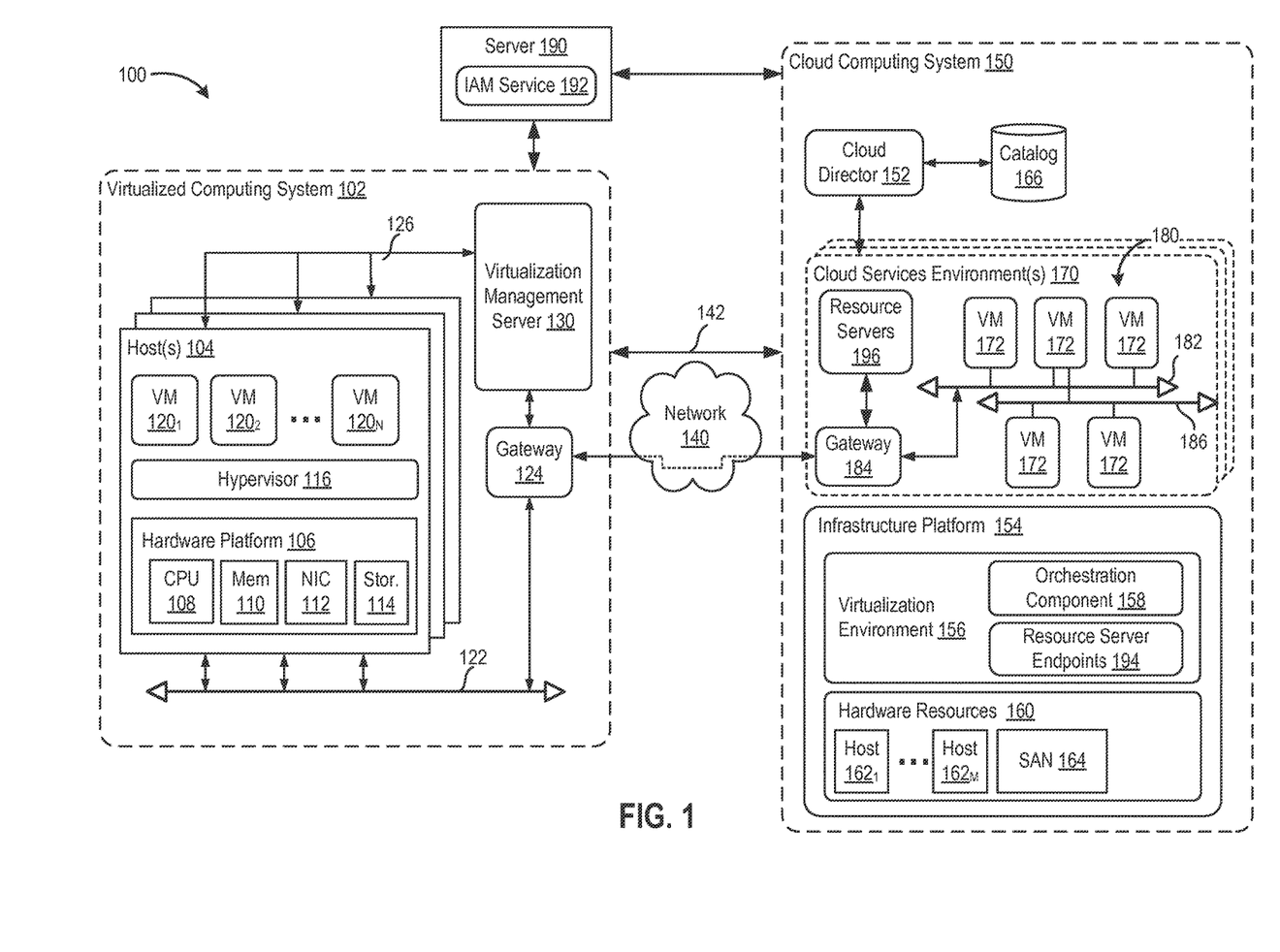
FIG. 1 is a block diagram of a hybrid cloud computing system in which one or more embodiments of the present disclosure may be utilized.

FIG. 1 is a block diagram of a hybrid cloud computing system 100 in which one or more embodiments of the present disclosure may be utilized. Hybrid cloud computing system 100 includes virtualized computing systems 102 and a cloud computing system 150, and is configured to provide a common platform for providing a microservices architecture based cloud services environment. Microservices refers to a software architecture in which complex applications are implemented using small, independent processes that communicate with each other using language-agnostic application programming interfaces (APIs). Hybrid cloud computing system 100 is one example of hardware on which such a micoservices architecture can be implemented.

In one embodiment, virtualized computing systems 102 may be data center controlled and administrated by a particular enterprise or business organization, while cloud computing system 150 is operated by a cloud computing service provider and exposed as a service available to account holders, such as the particular enterprise in addition to other enterprises. As such, virtualized computing systems 102 may sometimes be referred to as an on-premise data center(s), and cloud computing system 150 may be referred to as a "public" cloud service. In some embodiments, virtualized computing systems 102 may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Each virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware® ESXi™ hypervisor provided as part of the VMware® vSphere® solution made commercially available from VMware, Inc. Hypervisor 116 may run on top of the operating system of host 104 or directly on hardware components of host 104.

Virtualized computing system 102 includes a virtualization management server 130 that may communicate to the plurality of hosts 104 via a network, sometimes referred to as a management network 126. In one embodiment, virtualization management server 130 comprises a central server, which may reside in virtualized computing system 102, or alternatively, running as a VM in one of hosts 104. One example of virtualization management server 130 is the vCenter® Server product made available from VMware, Inc. Virtualization management server 130 is configured to carry out administrative tasks for virtualized computing system 102, including managing hosts 104, managing VMs 120 running within each host 104, provisioning VMs, migrating VMs from one host to another host, and load balancing between hosts 104.

In one or more embodiments, cloud computing system 150 is configured to dynamically provide an enterprise (or users of an enterprise) with one or more virtual data centers 180 in which a user may provision VMs 120, deploy multi-tier applications on VMs 120, and/or execute workloads. Cloud computing system 150 includes an infrastructure platform 154 upon which a cloud services environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud services environment 170 is associated with a particular tenant of cloud computing system 150, such as the enterprise providing virtualized computing systems 102. In one embodiment, cloud services environment 170 may be configured as a dedicated cloud service for a single tenant comprised of dedicated hardware resources 160 (i.e., physically isolated from hardware resources used by other users of cloud computing system 150). In other embodiments, cloud services environment 170 may be configured as part of a multi-tenant cloud service with logically isolated virtualized computing resources on a shared physical infrastructure. As shown in FIG. 1, cloud computing system 150 may support multiple cloud services environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud services environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud services environment 170 and provides additional infrastructure resources to cloud services environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud services environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud services environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud services environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within virtualized computing system 102. In other embodiments, gateway 184 may be configured to connect to communicate with virtualized computing systems 102 using a high-throughput, dedicated link (depicted as a direct connect 142) between virtualized computing systems 102 and cloud computing system 150. In one or more embodiments, gateways 124 and 184 are configured to provide a "stretched" layer-2 (L2) network that spans virtualized computing system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In an embodiment, hybrid cloud computing system 100 includes a server 190 executing an identity and access management (IAM) service 192. IAM service 192 provides user identity management, user authentication, user authorization, user privileges, and the like with respect to protected resources (resources) in hybrid cloud computing system 100. Server 190 can be a computer executing IAM service 192 within a host operating system, or a virtual machine executing IAM service 192 within a guest operating system. While server 190 is shown as being external to virtualized computing system 102 and cloud computing system 150, server 190 can be disposed within virtualized computing system 102 or cloud computing system 150.

Resources can include virtual machines or other virtual computing instances (e.g., containers), hypervisors, hosts, servers, services, applications, and the like disposed in virtualized computing system 102, cloud computing system 150, or both. In an example, cloud services environment 170 provides a compute service, and the resources comprise VMs. Resources can be managed by resource servers, which can be physical servers or virtual machines. Resource servers can be heterogeneous and have different policy document formats. In the example shown, cloud services environment 170 includes resource servers 196 for managing resources therein (e.g., VMs 172, software executing in VMs 172, and the like). Resource servers 196 establish resource server endpoints 194 for communication with IAM service 192. Resource server endpoints 194 provide interfaces within virtualization environment 156 between IAM service 192 and resource servers 196. In general, resource servers and resource server endpoints can be disposed anywhere within hybrid cloud computing system 100, depending on the associated resources (e.g., within virtualized computing system 102).

In distributed service oriented architectures with various servers holding protected resources, an established way to perform user-centric access control is to have a access control administrator author policy documents for end-users using an IAM service. Policy documents are meant to be expressive documents that allow administrators to put in place fine-grained access control by listing the resources the end-users have access to and in what capacity. When an end-user logs in, the associated policy documents in the requested scope are passed on to a resource server by embedding them into the access token. The resource server uses the policy documents to enforce access to the protected resources.

Conventional approaches require that a standardized policy document format be agreed upon between the IAM service and the various resource servers. This approach is restrictive in a many ways. Notably, the format of the policy document is centrally established by the IAM service. As such, the onus is on the IAM service to find common ground among the various resource servers in the system to determine a standardized policy document format that is acceptable to all. Evolution of the policy document format as and when new requirements come in is relatively difficult. Since the document format is common to the entire system, scaling non-additive changes to the format involves every service in the system and can be slow. Resource servers are restricted in ways that can allow administrators to represent their access control policies. If a particular resource server wishes to simplify (or enrich) its policy document format creatively, the resource server is at the mercy of the IAM service. As such, modification of a policy document can in some cases be impossible. This problem is pronounced when the resource server to be integrated with IAM is not owned by the same organization where ability to change the external resource server functionality is much less. Hence, integrating the IAM service and already-existing heterogeneous set of resource servers, which possibly use different policy document formats, involves significant changes to the resource servers.

In embodiments described herein, control of the policy document formats is delegated to resource servers 196. This allows IAM service 192 to decentralize the evolution, validation, and enforcement of policy document formats to resource servers 196 while still retaining the centralized storage, management and distribution of access control data. The inversion of control is achieved by having each of resource servers 196 first establish and decide how to evolve the policy document format in an optimal manner. Since this approach also inverts control of validating the documents, each resource server 196 also needs to expose a resource server endpoint 194 that performs policy document validation. Resource server endpoints 194 are registered with IAM service 192 using an established registration protocol between resource servers 196 and IAM service 192. IAM service 192 retains the responsibility of allowing policy documents to be authored and stored. When IAM service 192 receives a policy document edit request for an end-user, the edit is sent to the resource server endpoint associated with the resource server for policy validation.

Once a resource server has validated the policy document, IAM service stores the policy document against the end-user or group in its data store. Whenever the end-user (or member of group) requests access to a resource, the appropriate policy documents depending on the requested scope are embedded in an issued token. The appropriate resource server validates the token for authenticity and uses the embedded policy documents to enforce access to the protected resources.

The approach described herein does not require IAM service 192 to understand or process the policy document at any point. As far as the IAM service is concerned, the policy document that the policy administrator submits is an opaque string. In such an approach, the resource server decides the format of the policy document since the resource server is the only consumer of the format. The resource server takes upon the responsibility of validating the edited documents. The resource server continues to enforce the access control by reading the documents passed in via the token. This inversion of control empowers each resource server to control its policy document evolution without IAM service 192 being the bottleneck. IAM service 192, however, retains the responsibility of centrally storing, managing, and distributing access control data.

Figure 2:
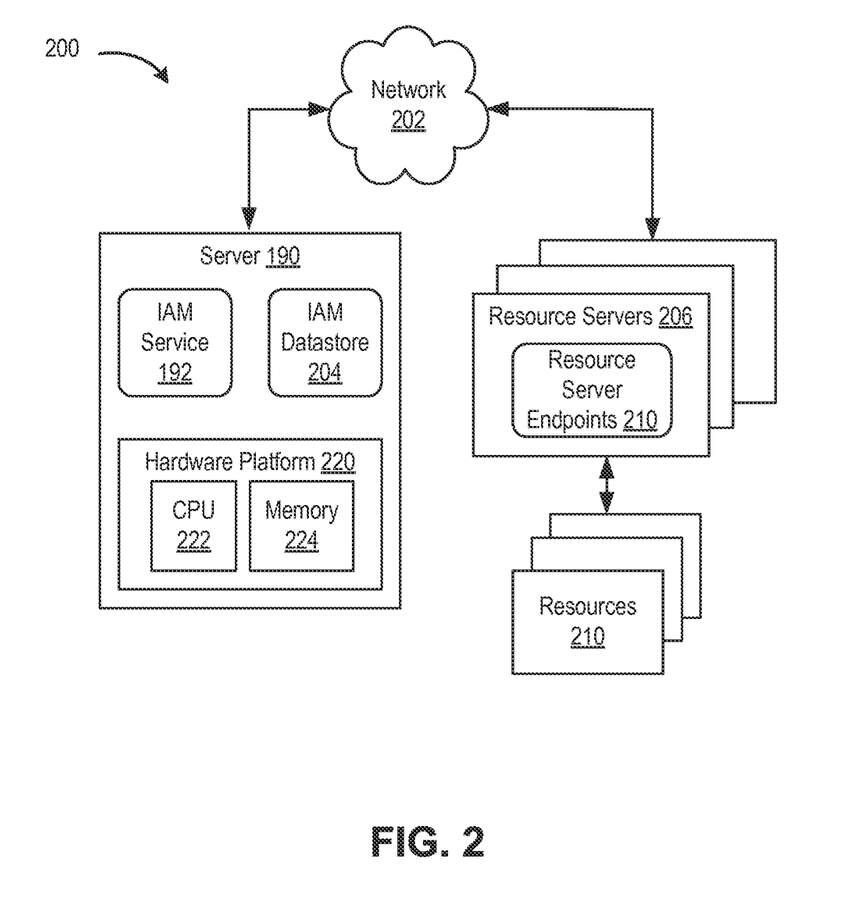
FIG. 2 is a block diagram depicting a cloud services environment having heterogeneous resource servers according to an embodiment.

FIG. 2 is a block diagram depicting a cloud services environment 200 according to an embodiment. Cloud services environment 200 includes server 190 having IAM service 192 and an IAM datastore 204, a network 202, a plurality of heterogeneous resource servers 206 (referred to as "resource servers 206"), and a plurality of resources 210. Cloud services environment 200 can be implemented using the hybrid cloud computing system 100 described above. For example, resources 210 can include virtual machines or other virtual computing instances (e.g., containers), hypervisors, hosts, servers, services, applications, and the like disposed in virtualized computing system 102, cloud computing system 150, or both. Resource servers 206 can comprise physical servers and/or virtual machines in virtualized computing system 102, cloud computing system 150, or both. Resource servers 206 are heterogeneous in that the resource servers have different policy document formats, as described further below.

Server 190 includes a hardware platform 220 having a CPU 222 and a memory 224. Hardware platform 220 supports IAM service 192 and IAM datastore 204. IAM datastore 204 stores policy documents and other metadata for resource servers 206. IAM service 192 registers resource servers 206, stores metadata for resource servers 206, stores policy documents validated by resource servers 206, and fetches policy documents to enforce access privileges for end-users. IAM service 192 is responsible for authenticating end-users and generating tokens for authenticated end users. The tokens include policies that define access privileges for the end-users. End-users gain access to resources 210 by presenting the tokens obtains from IAM service 192 to resource servers 206.

Resource servers 206 include resource server endpoints 210. Resource servers 206 register resource server endpoints 210 with IAM service 192. Resource server endpoints 210 can be a service, application, virtual machine or other virtual computing instance, or the like, which provides an interface to IAM service 192 for resource servers 206. Resource server endpoints 210 are operable to validate policy documents and control access to resources 210 by end-users.

Figure 3:
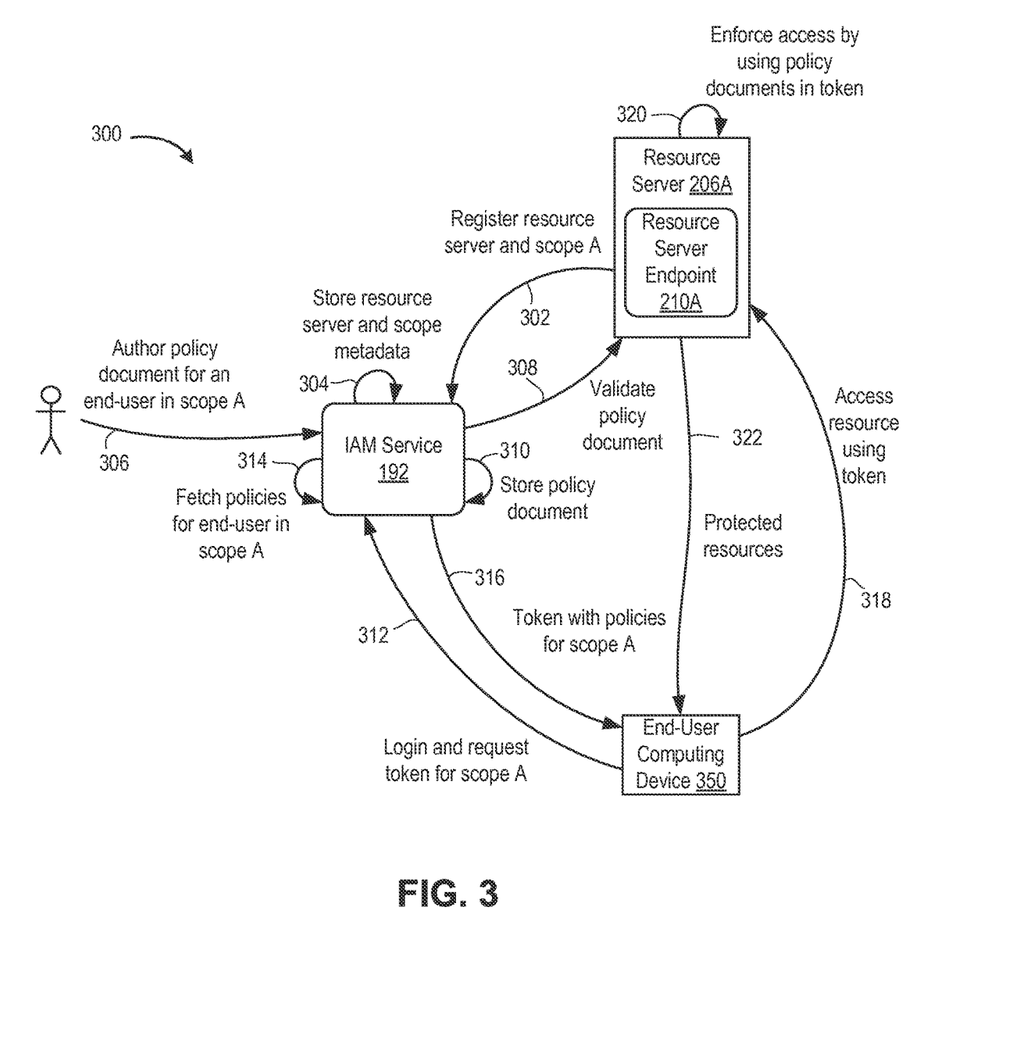
FIG. 3 is a data-flow diagram depicting access control policy management in a computing environment according to an embodiment.

FIG. 3 is a data-flow diagram depicting access control policy management in cloud services environment 200 according to an embodiment. As shown in FIG. 3, a resource server 206A communicates with IAM service 192 and an end-user computing device 350. End-user computing device 350 can be any type of computing device used by an end-user to authenticate with IAM service 192 and access resources managed by resource server 206A.

At step 302, resource server 206A registers with IAM service 192. In an embodiment, resource server 206A can register with IAM service 192 as part of a scope (e.g., scope A). Scopes can be used to provide logical divisions among resource servers 206. A given resource server 206 can be part of one or more scopes, and a given scope can include one or more resource servers 206. As part of registration, resource server 206A provides metadata to IAM service 192, which can include the name of the scope, the identity of resource server endpoint 210A, among other information, such as a version of an application programming interface (API) used by resource server endpoint 210A to validate policy documents. At step 304, IAM service 192 stores the metadata provided by resource server 206A in IAM datastore 204.

At step 306, a policy administrator can author and assign a policy document for a user or group in a given scope. The format of the policy document used by resource server 206A can be published in the product documentation, for use by the policy administrator in authoring the policy document. The policy administrator can interact with IAM service 192 to author and assign the policy document for a user or group.

At step 308, IAM service 192 interacts with resource server endpoint 210A to validate the policy document. IAM service 192 can also provide a token to resource server endpoint 210A containing privileges of the author of the policy document being validated. The privileges of the author can be represented using policy document(s) for the same scope as that of the policy document being validated. Resource server endpoint 210A can use token having the author's privileges to verify that the author is authorized to access the resources he or she is controlling. Once the policy document for the end-user is validated, IAM service 192 can store the policy document in IAM datastore 204 at step 310.

At step 312, an end-user through end-user computing device 350 authenticates with IAM service 192 and requests a token for scope A. At step 314, IAM service 192 retrieves policy document(s) assigned to the end-user and embeds the policy document(s) into a token. The retrieved policy document(s) can be associated with the end-user or with any group assigned to the end-user. In an embodiment, IAM service 192 can sign the token in a manner that can be verified using a public key of IAM service 192. At step 316, IAM service 192 provides the token to end-user computing device 350.

At step 318, end-user computing device 350 presents the token to resource server 206A for accessing controlled resource(s). At step 320, resource server 206A verifies authenticity of the token. For example, resource server 206A can validate a signature of the token using a public key of IAM service 192. Resource server 206A extracts policy document(s) from the token and then enforces access control to the requested resource(s). At step 322, resource server 206A can provide access to the protected resource(s) if the end-user has the appropriate privileges specified in the policy document(s).

Figure 4:
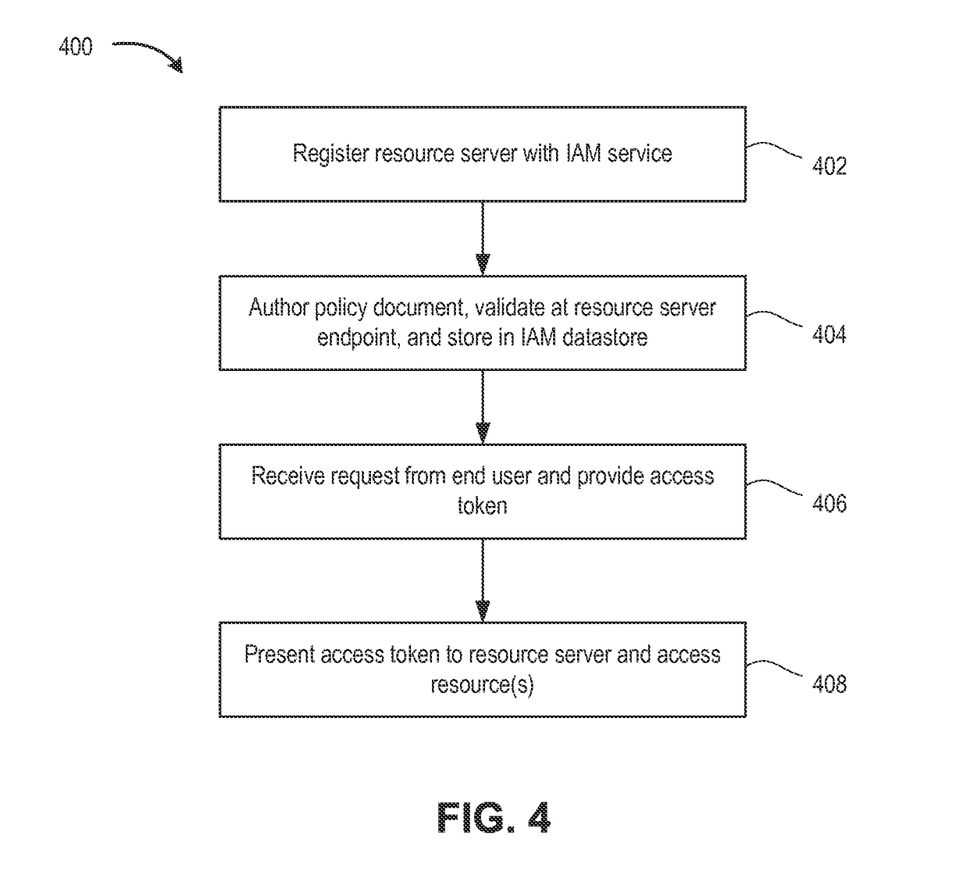
FIG. 4 is a flow diagram depicting a method of access control policy management in a computing environment according to an embodiment.

FIG. 4 is a flow diagram depicting a method 400 of access control policy management in a computing environment according to an embodiment. Method 400 begins at step 402, where a resource server 206 registers with IAM service 192. At step 404, a policy administrator authors a policy document, IAM service 192 sends the policy document to a designated resource server endpoint 210 for validation, and stores the validated policy document in IAM datastore 204. At step 406, IAM service 192 receives a request from an end user for access to protected resource(s) and provides an access token having policy document(s). At step 408, an end user presents the token to a resource server 206 and accesses the protected resource(s) based on access privileges defined in the policy document(s).

Figure 5:
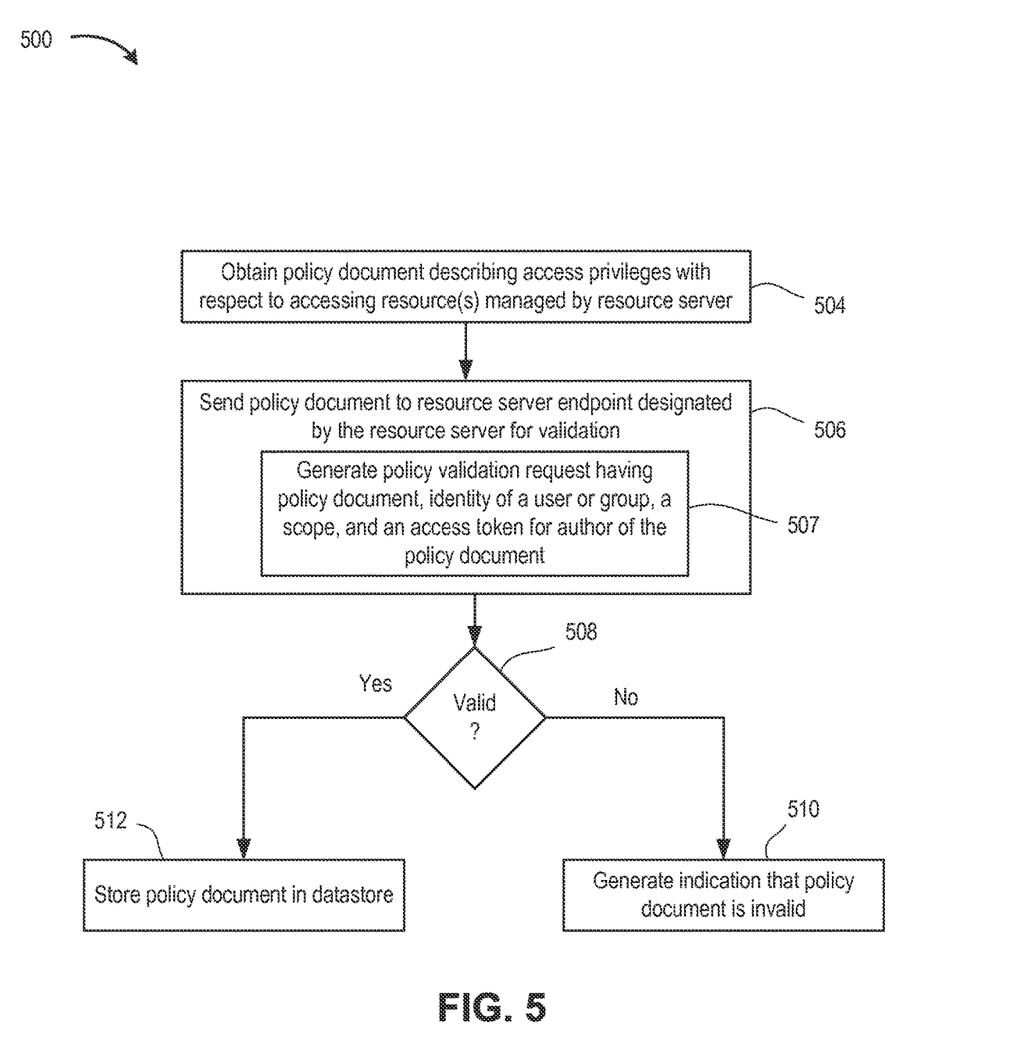
FIG. 5 is a flow diagram depicting a method validating a policy document according to an embodiment.

FIG. 5 is a flow diagram depicting a method 500 validating a policy document according to an embodiment. Method 500 can be performed during step 404 of method 400. Method 500 begins at step 504, where IAM service 192 obtains a policy document describing access privileges with respect to protected resource(s) managed by a resource server. At step 506, IAM service 192 sends the policy document to a resource server endpoint 210 designated by a resource server 206 for validation. Step 506 can include a step 507, where IAM service 192 generates a policy validation request having the policy document, an identity of a user or group, a scope, and an access token for an author of the policy document.

At step 508, IAM service 192 receives an indication from a resource server endpoint 210 on whether the policy document is valid. If so, method 500 proceeds to step 512, where IAM service 192 stores the policy document in IAM datastore 204. Otherwise, method 500 proceeds to step 510, where IAM service 192 generates an indication that the policy document is invalid. The policy administrator can then correct the policy document and repeat the validation process.

Figure 6:
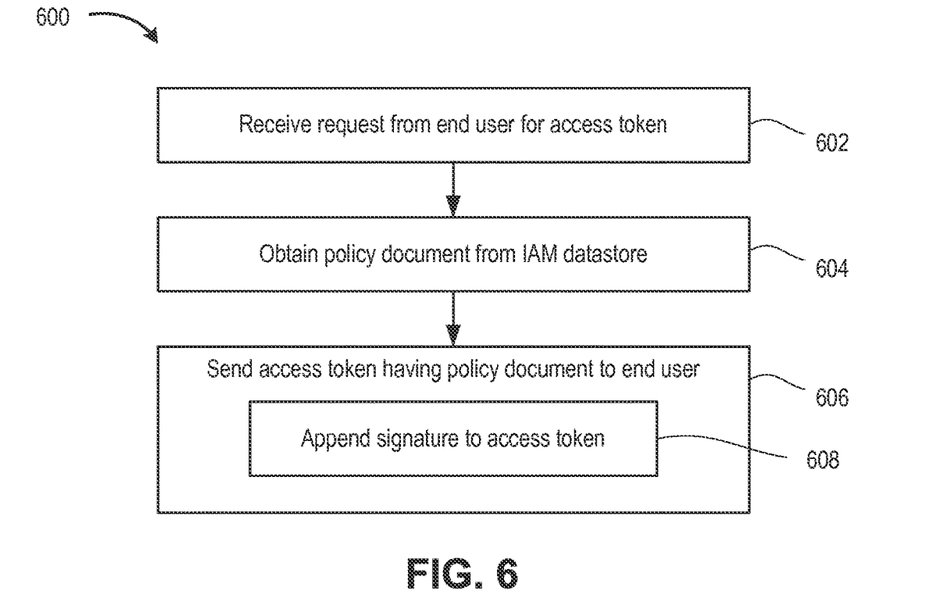
FIG. 6 is a flow diagram depicting a method of providing an access token to an end user according to an embodiment.

FIG. 6 is a flow diagram depicting a method 600 of providing an access token to an end user according to an embodiment. Method 600 can be performed during step 406 of method 400. At step 602, IAM service 192 receives a request from an end user for an access token. At step 604, IAM service 192 obtains a policy document from IAM datastore 204. At step 606, IAM service 192 sends the access token having the policy document to the end user. Step 606 can include a step 608, where IAM service 192 appends a signature to the access token.

Figure 7:
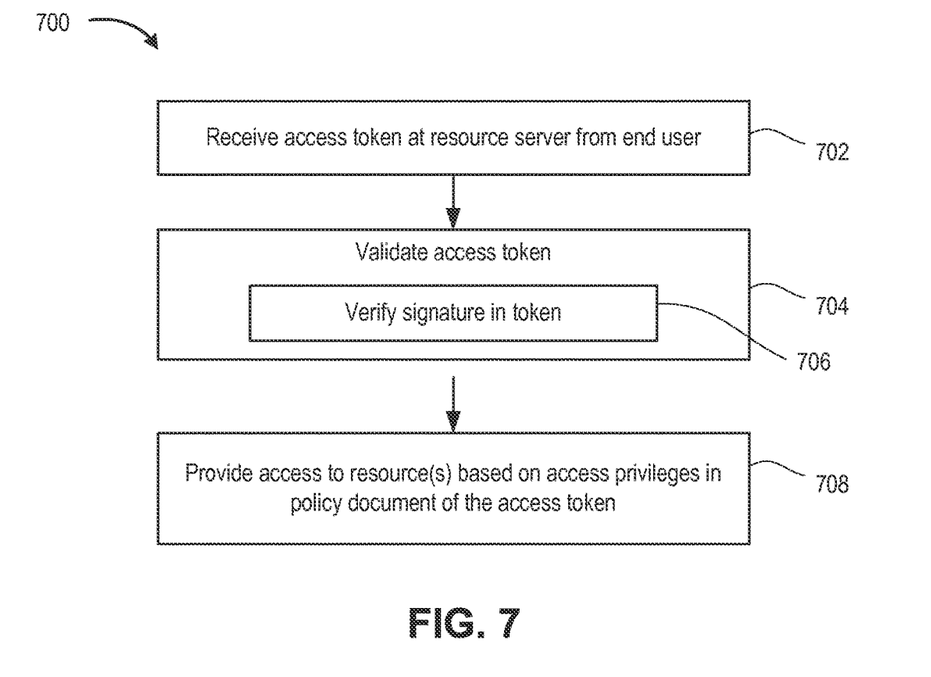
FIG. 7 is a flow diagram depicting a method of providing access to protected resources according to an embodiment.

FIG. 7 is a flow diagram depicting a method 700 of providing access to protected resources according to an embodiment. Method 700 can be performed during step 408 of method 400. At step 702, a resource server 206 receives an access token from an end user. At step 704, resource server 206 validates the access token. For example, at step 706, resource server 206 can verify the signature appended to the token using a public key of IAM service 192. At step 708, resource server 206 provides access to resource(s) based on access privileges in the policy document of the access token.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of managing access to resources managed by heterogeneous resource servers having different policy document formats in a cloud services environment, the method comprising:
obtaining, at an identity and access management (IAM) service, a policy document describing access privileges with respect to accessing at least one resource of the resources managed by a resource server of the heterogeneous resource servers;
without processing the policy document, sending the policy document from the IAM service to a resource server endpoint within the resource server for validation at the resource server endpoint;
storing, by the IAM service, the policy document in a datastore in response to a determination by the resource server endpoint within the resource server that the policy document is valid; and
in response to the determination by the resource server endpoint within the resource server that the policy document is valid, sending an access token having the policy document from the IAM service to an end-user computing device to be transmitted to the resource server endpoint for access to the at least one resource.

2. The method of claim 1, further comprising:
prior to obtaining the policy document, registering at the IAM service, metadata that includes a scope and the resource server endpoint of the resource server.

3. The method of claim 1, wherein the access token further includes a signature generated by the IAM service, the signature configured for verification using a public key of the IAM service.

4. The method of claim 1, further comprising:
receiving the access token at the resource server from the end-user computing device; and
providing access to the at least one resource by the end-user computing device based on the policy document of the access token.

5. The method of claim 4, further comprising:
verifying, by the resource server, a signature in the access token using a public key of the IAM service.

6. A computer system, comprising:
a hardware platform comprising a processor and a memory; and
an identity and access management (IAM) service comprising code stored in the memory and configured for execution by the processor to:
obtain a policy document describing access privileges with respect to accessing at least one resource of resources managed by a resource server of heterogeneous resource servers in a cloud services environment, the heterogeneous resource servers having different policy document formats;
without processing the policy document, send the policy document to a resource server endpoint within the resource server for validation at the resource server endpoint;
storing the policy document in a datastore in response to a determination by the resource server endpoint within the resource server that the policy document is valid; and
in response to the determination by the resource server endpoint within the resource server that the policy document is valid, send an access token having the policy document from the IAM service to an end-user computing device to be transmitted to the resource server endpoint for access to the at least one resource.

7. The computer system of claim 6, wherein the IAM service is further configured for execution by the processor to:
receive a registration request from the resource server, the registration request specifying a scope and the resource server endpoint.

8. The computer system of claim 6, wherein the access token further includes a signature generated by the IAM service, the signature configured for verification using a public key of the IAM service.

9. The computer system of claim 6, wherein the memory is configured to store the datastore.

10. A non-transitory computer readable medium comprising instructions, which when executed in a computer system, causes the computer system to carry out a method of managing access to resources managed by heterogeneous resource servers having different policy document formats in a cloud services environment, comprising:

obtaining, at an identity and access management (IAM) service, a policy document describing access privileges with respect to accessing at least one resource of the resources managed by a resource server of the heterogeneous resource servers;

without processing the policy document, sending the policy document from the IAM service to a resource server endpoint within the resource server for validation at the resource server endpoint;

storing, by the IAM service, the policy document in a datastore in response to a determination by the resource server endpoint within the resource server that the policy document is valid; and in response to the determination by the resource server endpoint within the resource server that the policy document is valid, sending an access token having the policy document from the IAM service to an end-user computing device to be transmitted to the resource server endpoint for access to the at least one resource.

11. The non-transitory computer readable medium of claim 10, further comprising:

receiving a registration request at the IAM service from the resource server, the registration request specifying a scope and the resource server endpoint.

12. The non-transitory computer readable medium of claim 10, wherein the access token further includes a signature generated by the IAM service, the signature configured for verification using a public key of the IAM service.

13. The non-transitory computer readable medium of claim 10, further comprising:

receiving the access token at the resource server from the end-user computing device; and providing access to the at least one resource by the end-user computing device based on the policy document of the access token.

14. The non-transitory computer readable medium of claim 13, further comprising:

verifying, by the resource server, a signature in the access token using a public key of the IAM service.

* * * * *